May 28, 1946.    O. V. LINDQUIST    2,401,087
DIAMOND DRILL BIT
Filed Nov. 8, 1945
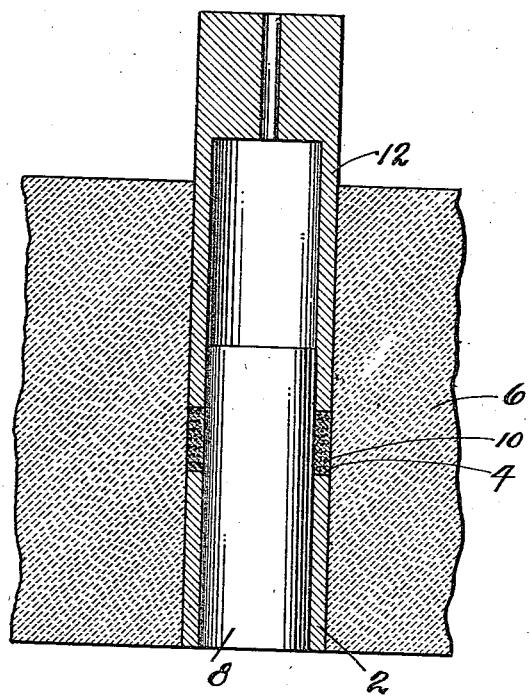
INVENTOR
Olaf V. Lindquist
BY James G. Bettell
ATTORNEY Patented May 28, 1946

2,401,087

UNITED STATES PATENT OFFICE 2,401,087

DIAMOND DRILL BIT

Olof V. Lindquist, Larchmont, N. Y., assignor to J. K. Smit & Sons, Inc., New York, N. Y., a corporation of New York Application November 8, 1945, Serial No. 627,326

6 Claims. (Cl. 51—309)

My invention is directed to an improvement in drill bits, particularly diamond drill bits adapted for drilling silicon and carbide grinding wheels, ceramics, etc.

One of the objects of my invention is to provide a diamond drill bit which not only possesses the ability to retain the diamonds and prevent their dislodgement, but is very highly abrasion resistant which is of importance and becomes a valuable asset when drilling materials such as those above mentioned, for example.

Broadly speaking my invention provides a diamond drill bit which is composed of a new material.

The accompanying drawing illustrates in sectional elevation the drill bit of this invention in the course of its manufacture.

The diamond drill bit of my invention comprises an elongated, relatively thin walled steel shell, tube or blank 2, to the end of which I attach diamonds 4 constituting the abrading and cutting elements of the bit.

In the manufacture of my improved bit I insert tube 2 on end in a graphite mold 6. A graphite plug 8 is inserted into the tube, this plug bottoming on the mold. The graphite plug is sufficiently long so as to extend above the end of the finished bit.

A layer of diamonds or diamond particles is then placed upon the upper end of the tube 2 and over and about this layer I apply a mixture 10 of powdered metals. Then another diamond layer is placed upon the metal powder and more metal powder upon this layer followed by still another diamond layer, until as many layers or strata as may be desired have been placed in position.

Pressure of around 1000 lbs. per square inch is then applied to the diamond and powdered metals mass by the plunger 12, after which I heat, preferably in an inert atmosphere to around 2000° F. for five or ten minutes, and before the mass has cooled pressure of the order mentioned above is again applied thereto.

The tool is then removed from the mold and allowed to cool down or it may be quenched, depending upon the characteristics desired in the finished tool.

The powdered metals portion of the drill bit constitutes a matrix in which the diamonds are embedded and retained. This matrix is of new and novel composition. It is composed of a mixture of manganese, carbon, iron and nickel boron.

It is to be understood that the relative quantities of these materials may be varied, but I have obtained excellent results when employing the following parts by weight:

Manganese _____ 1½
Carbon _____ 1½
Iron _____ 80
Nickel boron _____ 17

I find in the sintering process that the iron particles alloy with the manganese and carbon and hence are changed into manganese steel particles.

The nickel boron has a lower melting point than the manganese steel particles, so that at the temperature used, say 2000° F. the nickel boron flows freely around all the manganese steel particles welding them together and welding the entire sintered metal mass to the steel blank 2. I find also that the matrix of my improved tool is exceptionally tough and abrasive-resistant adapting the same for thin walled shapes capable of withstanding the abuse to which my tool is subjected in the drilling of such materials as coarse silicon and carbide grinding wheels.

What I claim is:

1. A diamond tool comprising a steel blank and a diamond-impregnated matrix of manganese steel particles welded to each other and to the tool blank by nickel boron.

2. A diamond tool comprising a metal blank and a diamond-impregnated matrix of sintered manganese steel particles welded to each other and to the tool blank by nickel boron.

3. In the making of diamond tools the method which comprises subjecting a pressed mass of manganese and carbon, iron and nickel boron particles and diamond particles to a temperature at which the manganese, carbon and iron are converted to particles of manganese steel welded together into a tough, highly abrasive-resistant mass by the nickel boron.

4. In the making of diamond tools the method which comprises subjecting a mass of manganese, carbon, iron and nickel boron particles and diamond particles to pressure, thereafter converting the manganese, carbon and iron particles to particles of manganese steel and welding the manganese steel particles to each other with the nickel boron, by subjecting the pressed mass to a temperature of around 2000° F.

5. In the making of diamond tools the method which comprises applying pressure to a mass comprising diamond particles and particles of manganese, carbon, iron and nickel boron in the following quantities by weight:

| | |
|---|---|
| Manganese | 1½ |
| Carbon | 1½ |
| Iron | 80 |
| Nickel boron | 17 | and subjecting the pressed mass to a temperature of around 2000° F. to convert the manganese, carbon and iron to manganese steel particles and to cause the nickel boron to flow around the steel particles to weld the same to each other.

6. In the making of diamond tools the method which comprises applying pressure of the order of 1000 pounds per square inch to a mass comprising diamond particles and particles of manganese, carbon, iron and nickel boron, subjecting the pressed mass to a temperature of around 2000° F. for a length of time sufficient to convert the manganese, carbon and iron to manganese steel particles, and to cause the nickel boron to flow around the steel particles to weld the same to each other, and while the mass is still at an elevated temperature again subjecting to a pressure of the order of 1000 pounds per square inch.

OLOF V. LINDQUIST.